United States Patent
Burke et al.

(10) Patent No.: US 6,597,785 B1
(45) Date of Patent: Jul. 22, 2003

(54) AUTOMATIC CALLER ID CALL LOG DIAL BACK

(75) Inventors: Edmund Thomas Burke, West Long Branch, NJ (US); Benjamin Wilson Day, Monmouth, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/173,533

(22) Filed: Oct. 15, 1998

(51) Int. Cl.[7] .............................. H04M 1/00; H04M 3/00
(52) U.S. Cl. .............................. 379/355.08; 379/88.21; 379/142.06; 379/355.05; 379/209.01
(58) Field of Search ............ 379/355.1, 355.01–355.09, 379/142.01–142.18, 88.19, 356.01, 209.01, 120, 127.06, 88.21, 88.2, 207.13, 207.15, 29.01, 6, 245–249; 455/414

(56) References Cited

U.S. PATENT DOCUMENTS

| | | | | | |
|---|---|---|---|---|---|
| 5,883,942 A | * | 3/1999 | Lim et al. | ............... | 379/142.01 |
| 5,917,904 A | * | 6/1999 | Theis | .................... | 379/355.08 |
| 6,009,158 A | * | 12/1999 | Romero | ................. | 379/209.01 |
| 6,067,349 A | * | 5/2000 | Suder et al. | ............. | 379/88.19 |

\* cited by examiner

*Primary Examiner*—Forester W. Isen
*Assistant Examiner*—Con P. Tran
(74) *Attorney, Agent, or Firm*—Cohen, Pontani, Lieberman & Pavane

(57) ABSTRACT

A telephone system incorporating the present invention provides the capability for automated dialing of a telephone number stored in a caller ID log by determining the correct dialing procedure and then dialing the telephone number in accordance with the correct dialing procedure.

9 Claims, 3 Drawing Sheets

AUTOMATIC CALLER ID CALL LOG DIAL BACK

BACKGROUND OF THE INVENTION

1. Field of the Invention

The present invention relates to a caller ID logging feature for a telephone system for automatically dialing a telephone number of a caller ID record stored in a caller ID log.

2. Description of the Related Art

Telephone systems, including residential, wireless, and business telephone systems, are connected via telephone lines to a Central Office (CO) of the telephone company or service provider to which the owner of the telephone system subscribes. Residential telephones are normally directly connected to a telephone line. Wireless telephones transmit their signals to a wireless receiver that is connected to a telephone line or directly to the CO. Business telephone systems typically comprise a plurality of telephone sets or stations sharing one or more telephone lines, with the plural stations connected to a central processor of the telephone system. The central processor is in turn connected to the one or more telephone lines which connect the central processor to the CO. The processor handles switching of incoming calls to and between the telephone stations, interconnection of phones for accommodating conference calls, storage of voice mail messages for the individual stations, and other functions. Residential phones and wireless phones may also have processors for storing or processing information.

The COs now generally provide caller ID information for incoming calls to telephone systems, which is known as incoming caller line identification (ICLID). The ICLID information generally includes the telephone number of the incoming call, a subscriber name associated with the telephone number, a date and time, and other information about the originating location of the call. This information is displayable on a caller ID display unit located at the receiving station of the business, residential, or wireless telephone system when the incoming call causes the receiving station telephone to ring. A further advantageous capability that is available is the caller ID logging function in which the caller ID information is stored in a memory of the telephone set or system when the incoming call is not answered (or, if answered, to keep a log of a user's activity). Even more advantageous is the ability to automatically dial or redial the telephone number from the stored ICLID information.

The standard formats for telephone numbering plans are usually hierarchical. For example, for telephones in North America, the standard format is prescribed by the North American Numbering Plan (NANP) as a three digit Numbering Plan Area Code (NPA), followed by the three digit office (CO) code, followed by a four digit intraoffice identifier. This format is followed consistently throughout the NANP area and conforms to international numbering standards. However, dialing procedures, which refer to the use of prefixes such, for example, as 0, 1, 10XXX or suffixes to the NANP numbers, vary throughout the NANP and are often locally determined by state regulatory agencies. Therefore the NANP defines, for each NPA, the procedure that must be used to place the following types of calls:

Home NPA Local Calls—Locals calls within a home area code of the telephone system (e.g., calls to your neighbor);

Home NPA Toll Calls—Toll calls within the home area code (e.g., a call from one end of the area covered by the 914 area code to the other end of the area covered by the 914 area code);

Foreign NPA Local Calls—Local calls to a foreign area code (e.g., in a town with split area codes, calling someone across town in the other area code); and Foreign NPA Toll Calls—Toll calls to a foreign area code (e.g., calls from New York State to Oregon).

Thus, in some parts of the NANP, toll calls within the caller's home NPA are dialed on a 7-digit basis, whereas in other areas, these same types of toll calls are dialed using the digit "1" as a toll indicator prefix and the full 10 digit number.

The telephone number portion of the ICLID information for NANP phones is delivered in a standard format including the three digit area code, the three digit office code, and the four digit intraoffice identifier. To properly return a call logged by the caller ID log, the number as listed in the ICLID record must be altered in most cases to conform with the calling procedure for the dialing user's area code and the type of call in the caller ID log.

Prior art telephone systems that include an automatic dialback function supply only two options to the user. The first is to dial the number as received and stored. In many cases, however, the Central Office is unable to complete a call using the exact number stored in the memory, and an attempted call using that number results in a misdialed call or an error message. The second option permits the user to selectively edit the number stored in memory which, however, requires that the user enter "edit mode" and then make the necessary changes to the stored number before then manually initiating the dialing function. User editing of the number is thus frequently required, a procedure that is cumbersome and does not provide a significant improvement in efficiency over simple manual dialing of the number.

Another prior art type telephone system that includes an automatic dialback function is described in commonly-owned U.S. patent application Ser. No. 09/092,371, the entire contents of which are incorporated herein by reference. In that reference, automated dialing is accomplished by pressing one of a plurality of user actuatable keys that are selectively depressible to automatically dial one or more portions of the stored telephone number as may be required by the local central office to properly address and complete the call. The user may also manually enter an additional prefix and/or select a specific available telephone line on which to route the call before actuating one of the keys for automated dialing of the stored number. This system, however, places the entire burden of choosing the correct format on the user.

SUMMARY OF THE INVENTION

A telephone system in accordance with the present invention provides the capability for successfully automatically dialing a telephone number stored in a caller ID log by determining the correct dialing procedure for that call and then dialing the telephone number in accordance with the correct dialing procedure, and for automatically learning the correct dialing procedure for the number to be dialed if a correct dialing procedure can not be determined.

In the inventive procedure, the user selects a caller ID record from a caller ID log with a telephone number to be called back. The user then presses a "dial" button, in response to which the user's telephone system looks up the NPA of the telephone number of the selected caller ID record in a memory that includes NPAs and associated algorithms. After the NPA is found in the memory table, the associated algorithm is used to reformat the telephone number in accordance with a specific dialing procedure and the reformatted number is then dialed. If the call is completed, the system's current association of that caller ID type and reformatting algorithm are deemed correct. However, sometimes the associated algorithm is incorrect, for example because of changes in the assignments of the NPAs. The assignment of NPAs is constantly being altered or revised to provide relief for those NPAs that are near to exhausting their available central office codes. Relief for those NPAs includes boundary realignment, splitting, and overlaying of NPAs. An incorrect algorithm may thus cause an intercept treatment by the telephone system or a wrong number. If the user receives an intercept treatment such, for example, as an error message or completes a call to a wrong number, the user presses the "dial" button again without going on-hook. The second pressing of the "dial" button in this manner signals the system to update the association record to another algorithm, terminate the previous failed call attempt, and dial again using the new algorithm. This process is repeated until the call is completed successfully, after which the memory has stored the new correct association of the caller ID type and reformatting algorithm.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
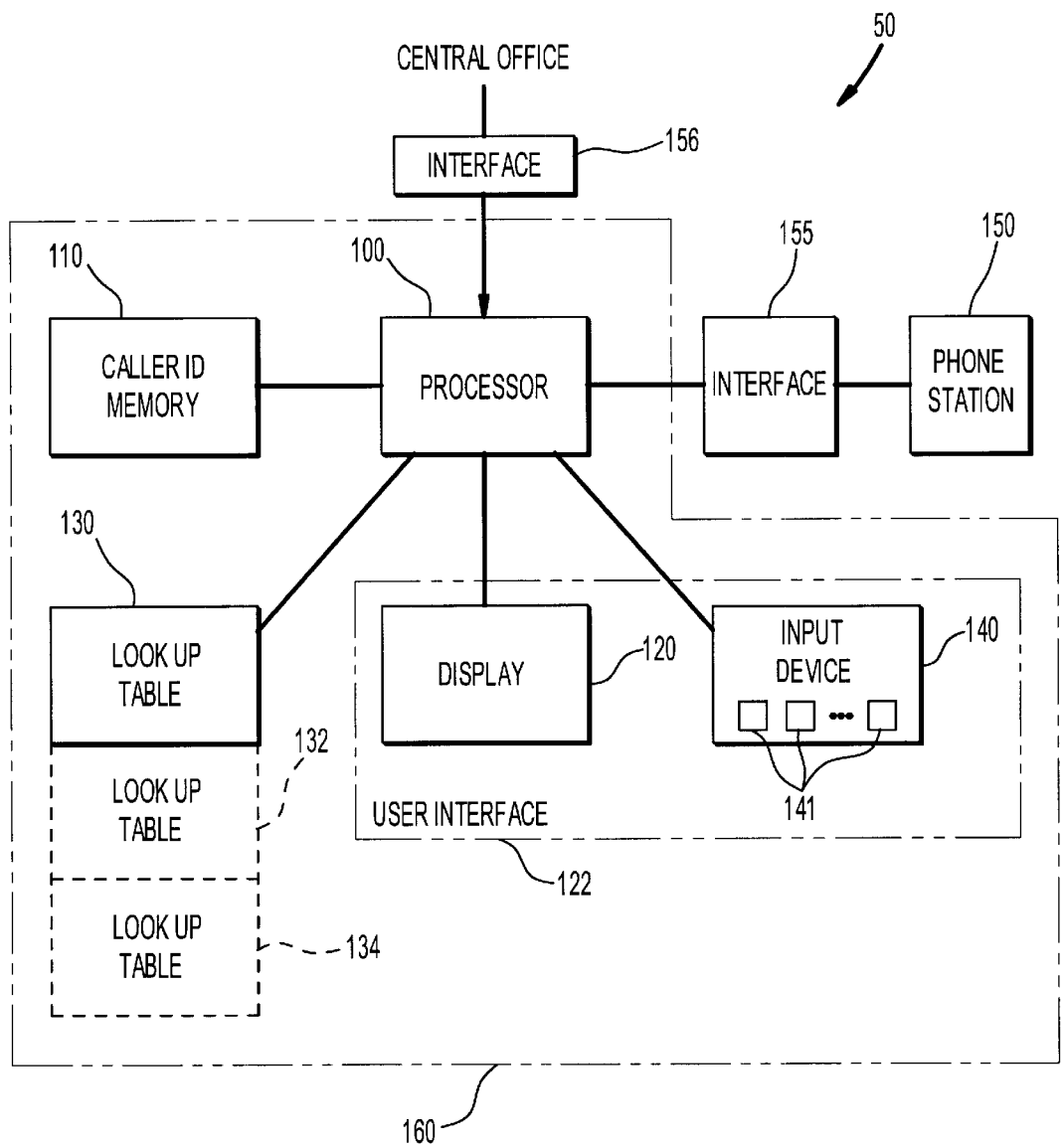
FIG. 1 is a schematic view of a telephone system in which the inventive method may be implemented.

The present invention is directed to a method for automatically dialing a telephone number listed in a caller ID record of a caller ID log. Referring initially to FIG. 1, the automated dialing method of the present invention is generally intended for use with or incorporation in an otherwise conventional telephone set or station 150 having or associated with a caller ID log device 160. The caller ID log device 160 comprises a processor 100 connected to a caller ID memory 110, a display 120, a look-up table 130, and an input device 140. Although depicted as located externally and separate from one another, the station 150 and the caller ID log device 160 may comprise a single integral unit. The caller ID log device 160 may also be incorporated in a computer connected to or forming a part of the station 150. In yet another embodiment, the caller ID log circuit 160 is located remote from the station such, for example, as at a central processing server for a telephone system, except for the display 120 and input device 140, which should be located in the vicinity of the station 150 so that a user of the station 150 has viewable access to the caller ID information stored in memory or log 110.

The station 150 and the caller ID log device 160 are connected to a central office (CO) of the service provider to which the owner of station 150 subscribes via an interface 156 and the station 150 is connected to the caller ID log device 160 via another interface 155. The CO transmits and receives analog signals using a two wire connection known as tip and ring. If the station 150 comprises a conventional telephone designed to receive and directly connect with the tip and ring wires and use the analog signals communicated over the tip and ring wires, the interfaces 155 and 156 may comprise wire connections. However, the station 150 may also comprise a telephone designed to operate using digital signals, in which case at least one of the interfaces 155 and 156 must convert the analog tip and ring signals to the digital signal recognizable by the telephone station 150.

The display 120 and input device 140 may be incorporated on the station 150 or in a separate housing connected to or associated with the station 150 as for example depicted in commonly-owned U.S. patent application Ser. No. 09/092,371, the entire contents of which are incorporated herein by reference. The display 120 and input device 140 may also comprise the screen and keyboard, respectively, of a personal computer to which the station 150 is connected. The input device 140 comprises keys 141 which may, by way of example, be user-depressible pushbutton switches, but may nevertheless be implemented using any switch or other technology, as a general matter of design choice, presenting selectable user-activation or initiation of the functionality provided by the keys. The keys 141 are used to access the caller ID memory and to select a specific caller ID record to automatically view and dial back. The access and selection of the caller ID log record may, for example, be performed in the manner described in U.S. patent application Ser. 09/092,371. However, any known or appropriate method for scrolling or searching through records of a database may be used. In addition to containing the caller ID log, the caller ID memory 110 may also contain or store a user-editable listing of telephone numbers to be called, such as a client or contacts list.

Figure 2:
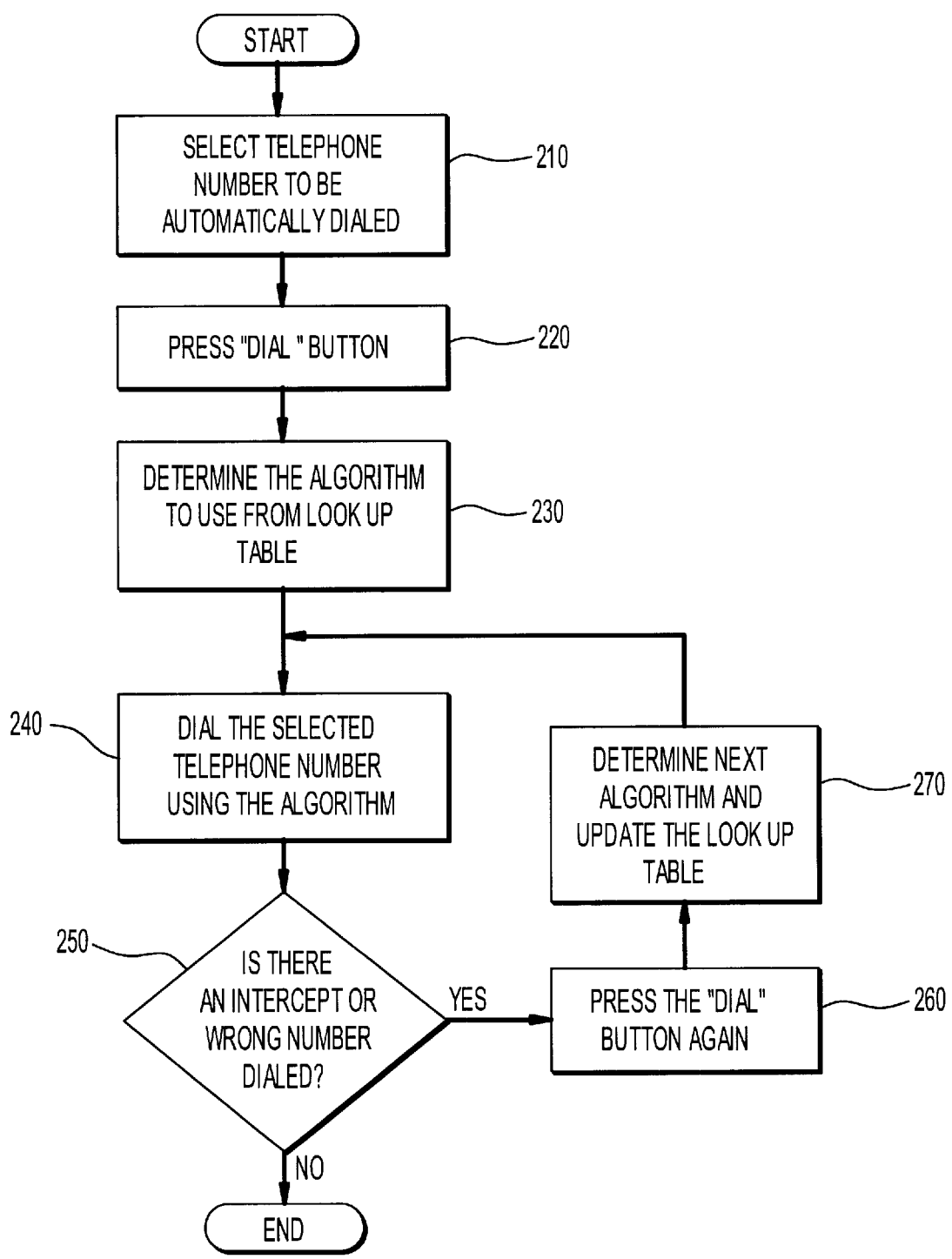
FIG. 2 is a flow diagram according to a preferred embodiment of the present invention.

The automatic dialing routine of the present invention is shown in FIG. 2, and will now be described. In step 210, the user of the telephone system 50 selects a caller ID record in the caller ID log to call back. The user then initiates the call back process by entering a "dial" command in step 220. The "dial" command may be entered by depressing one of the keys 141 on the input device 140 that is associated with the "dial" command. The one of the keys 141 may initiate a fixed specific function such that the key always has the function of the "dial" command. The one of the keys 141 may also provide or define a soft key with varying functionality for different routines of the telephone system and which may assume the functionality of the "dial" command during a search of the caller ID log. The "dial" command may also be entered by a function key or typed in on the letter keys of a keyboard of a computer if the input device 140 is implemented by such a keyboard.

After the "dial" command is entered or initiated, the processor 100 determines in step 230 the particular dial out procedure to be for dialing the selected number in the caller ID log. The determination is made by reading the NPA of the telephone number in the selected caller ID record of the log, and searching through the look-up table 130 to determine an algorithm index associated with that NPA. The look-up table 130 comprises a list of all known NPAs and an associated algorithm for each. Once the associated algorithm is identified, the processor 100 dials in step 240 the number using to the calling procedure prescribed by the algorithm.

The following Table 1 lists, by way of illustrative example, different types of algorithms that may be used, and Table 2 shows an excerpt of the look-up table 130.

TABLE 1

| Algorithm Index | Algorithm Name | Algorithm Description |
| --- | --- | --- |
| 0 | 1 + 10D | Dial out 1 followed by the last 10 digits |
| 1 | 7D | Dial out the last 7 digits |
| 2 | 10D | Dial out the last 10 digits |
| 3 | 1 + 7D | Dial out 1 followed by the last 7 digits |
| 4 | 5D | Dial out the last 5 digits |

TABLE 2

| NPA | Algorithm Index |
| --- | --- |
| . | . |
| . | . |
| . | . |
| 201 | 0 |
| 202 | 1 |
| 203 | 0 |
| 204 | 4 |
| 205 | 2 |
| 206 | 0 |
| 207 | 0 |
| 208 | 0 |
| 209 | 0 |
| 210 | 0 |
| . | . |
| . | . |
| . | . |

As an example of the procedures of steps 230 and 240, if the telephone number to be dialed is 201-123-4567, then processor 100 locates the NPA 201 in the look-up table (Table 2) and determines that the associated algorithm index is 0, which indicates to the processor that the number should be dialed as 1 201 123 4567. If the NPA of the telephone number is 202 on the other hand, then processor 100 locates the NPA in the look-up table (Table 2) and determines that the associated algorithm index is 1, which indicates that the number should be dialed as 123 4567.

In step 250, the user determines whether an intercept has been received, indicating that the call could not be completed as dialed, or whether the wrong number was dialed. In either case, if the user once again enters the "dial" command in step 260 without going on hook, the processor recognizes this action as a signal that an incorrect calling procedure was used and that the look-up table 130 should be updated. In step 270, the processor then updates the association record in the look-up table 130 with the next algorithm in Table 1 and repeats step 240. Steps 240 through 270 are repeated until the correct call procedure is used. The look-up table 130 remains updated with the algorithm which resulted in the completed call, thereby enabling the telephone system 50 to learn of changes in the network without reprogramming by a system administrator.

Figure 3:
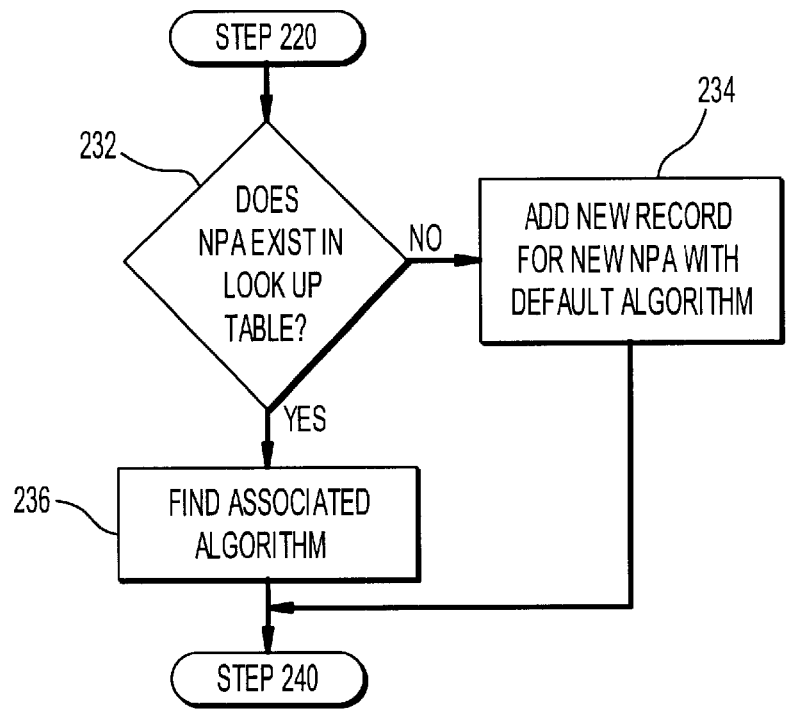
FIG. 3 is a flow diagram showing optional steps for the method of FIG. 2.

To conserve memory space, the look-up table 130 may only include active NPAs. Since some of the changes to the network may involve the addition of new NPAs, the NPA of a stored record might not exist in the look-up table 130. Referring to FIG. 3, step 230 may therefore further comprise the step or sub-step 232 of determining whether the NPA of the telephone number to be dialed exists in look-up table 130. If the NPA does exist, then in step 236 processor 100 finds the NPA in the look-up table and determines the algorithm. If the NPA does not exist in the table, then in step 234 processor 100 adds a new record to the look-up table for the new NPA with a default algorithm code. The process then continues at step 240.

In another embodiment, instead of using step 270 the next algorithm in the list of algorithms, the most widely used of the other algorithms may be tried first, in place of the originally associated algorithm. If that first-tried algorithm produces an intercept error or a wrong number, then the next most widely used algorithm is employed, and so on, until the correct format is identified. For example, most of the dialing procedures in the NANP are those procedures associated with algorithm index 0 or 1 in Table 1. In all likelihood, therefore, if the correct procedure is not algorithm index 1, then it is algorithm index 0. However, if the look-up table originally had an index 1 and some changes in the network altered that NPA to require an algorithm index 0, then the inventive procedure would try algorithms 2, 3, and 4 before it tried the correct algorithm 0. In a preferred embodiment, step 270 first updates the look-up table with the most widely used algorithm index.

Figure 4:
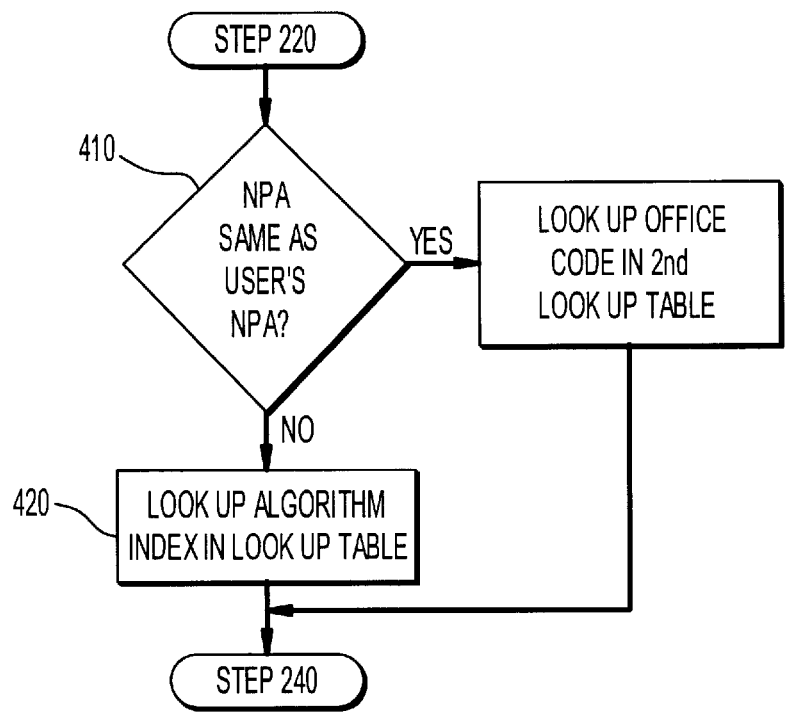
FIG. 4 is a flow diagram showing additional optional steps for the method of FIG. 2.

In another embodiment, depicted in the modifications of FIG. 4, the look-up table 130 may include a second layer look-up table with a list of the three-digit office codes of the user's home NPA. This is especially useful in those NPAs in which local calls within a user's home NPA must be dialed using a different calling procedure than toll calls within the user's home NPA. In this modification, step 230 comprises the substep 410 of determining whether the NPA of the telephone number to be called is the same as the user's NPA. If not, then the procedure progresses as described above and retrieves an algorithm index from the look-up table 130 in step 420. If the NPA's of the user and the telephone number to be dialed are the same, then processor 100 looks up the three-digit office code of the telephone number to be dialed in a second look-up table 132 (shown in dotted lines in FIG. 1) in step 430. In this embodiment, step 270 updates the appropriate one of the look-up table 130 and the second layer look-up table 132.

In addition to differences in the handling of local and toll calls within a user's home NPA, there are some instances in which local calls and toll calls to a foreign NPA are treated differently. This situation usually occurs along the borders of adjacent NPA areas, particularly those that divide towns and/or cities. Thus, in another modification or embodiment, the processor operatively recognizes a neighboring NPA and a separate look-up table 134 is used for the office codes in that neighboring area. The steps are similar to those shown in FIG. 4 except that, at step 410, the search is for the neighboring NPA instead of the user's home NPA.

In still another optional embodiment, the look-up table 130 includes algorithms associated with all NPA and office code pairs within each NPA. This of course requires a larger memory but covers all possible situations.

Although the NANP number scheme is used by way of illustrative example throughout this application in describing the various features of the invention, the present invention may be implemented for any hierarchical numbering scheme in which certain portions of the telephone numbers relate to or identify particular known or associated areas or regions.

Similarly, the algorithms listed in Table 1 are disclosed only as examples and different and/or additional algorithms may be added or substituted depending on the dialing procedures that are utilized or applicable in the communications system in which the inventive procedure is implemented.

Thus, while there have been shown and described and pointed out fundamental novel features of the invention as applied to preferred embodiments thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A method for automatically dialing, from a user's telephone system, a telephone number having a first portion and a second portion and stored in a record of a memory to establish a communication connection to a remote location associated with the telephone number, comprising the steps of:

selecting a record in the memory in which the telephone number to be dialed is stored;

receiving a first dial command for signaling to a processor of the user's telephone system an automatic dial back request for attempting to establish the communications connection to the remote location associated with the selected record;

determining, by the processor, a dialing procedure to be used in response to the automatic dial back request in accordance with the telephone number of the selected record by determining whether the first portion of the telephone number to be dialed is the same as a first portion of a telephone number of the user's telephone system, locating, when the first portion of the telephone number to be dialed is different from the first portion of the telephone number of the user's telephone system, the first portion of the telephone number to be dialed in a first look-up table comprising a list of telephone number first portions and algorithms associated with the telephone number first portions, wherein each algorithm corresponds to one of a plurality of calling procedures applicable to the telephone system, and determining the algorithm associated with the first portion of the telephone number to be dialed, locating, when the first portion of the telephone number to be dialed is the same as the first portion of the telephone number of the user's system, the second portion of the telephone number to be dialed in a second look-up table comprising a list of telephone number second portions and algorithms associated with the telephone number second portions, wherein each algorithm corresponds to one of a plurality of calling procedures applicable to the telephone system, and determining the algorithm associated with the second portion of the telephone number to be dialed; and automatically dialing, by the telephone system, the telephone number of the selected record using the determined dialing procedure.

2. A method for automatically dialing, from a user's telephone system, a telephone number having a first portion and a second portion and stored in a record of a memory to establish a communication connection to a remote location associated with the telephone number, comprising the steps of:

selecting a record in the memory in which the telephone number to be dialed is stored;

receiving a first dial command for signaling to a processor of the user's telephone system an automatic dial back request for attempting to establish the communications connection to the remote location associated with the selected record;

determining, by the processor, a dialing procedure to be used in response to the automatic dial back request in accordance with the telephone number of the selected record by locating the first portion of the telephone number to be dialed in a stored look-up table comprising a list of telephone number first portions and algorithms associated with the telephone number first portions, wherein each algorithm corresponds to one of a plurality of calling procedures applicable to the telephone system, and determining the algorithm associated with the located first portion for use in automatically dialing the telephone number;

automatically dialing, by the telephone system, the telephone number of the selected record using the determined dialing procedure;

determining whether a call has been successfully completed by said step of automatically dialing;

receiving a second occurrence of the dial command for signaling to the processor that the determined dialing procedure is incorrect, when it is determined that the call was not successfully completed;

updating the look-up table by replacing the determined algorithm in the look-up table with a new algorithm in response to said step of reentering;

automatically dialing by the telephone system, the telephone system to be dialed in accordance with the replaced next algorithm; and repeating said step of determining whether the call has been successfully completed by said step of automatically redialing in accordance with the next algorithm, thereby automatically adapting the user's telephone system to network changes.

3. The method of step 2, wherein said step of updating comprises replacing the determined algorithm with a next listed algorithm in a list of algorithms.

4. The method of claim 2, wherein said step of updating comprises replacing the determined algorithm with a most widely used algorithm from a list of algorithms.

5. A method for automatically dialing, from a user's telephone system, a telephone number having a first portion and a second portion and stored in a record of a memory to establish a communication connection to a remote location associated with the telephone number, comprising the steps of:

selecting a record in the memory in which the telephone number to be dialed is stored;

receiving a first dial command for signaling to a processor of the user's telephone system an automatic dial back request for attempting to establish the communications connection to the remote location associated with the selected record;

determining, by the processor, a dialing procedure to be used in response to the automatic dial back request in accordance with the telephone number of the selected record by locating the first portion of the telephone number to be dialed in a stored look-up table comprising a list of telephone number first portions and algorithms associated with the telephone number first portions, wherein each algorithm corresponds to one of a plurality of calling procedures applicable to the telephone system, and determining the algorithm associated with the located first portion for use in automatically dialing the telephone number; and automatically dialing, by the telephone system, the telephone number of the selected record using the determined dialing procedure, wherein, before said step of locating, said method further comprises the steps of determining whether the first portion of the telephone number to be dialed is listed in the look-up table and adding to the look-up table the first portion of the telephone number and a default associated algorithm if the first portion of the telephone number is determined to not be listed in the look-up table, thereby adapting the user's telephone system to network changes.

6. A caller ID log device for use with a user's telephone system for automatically dialing from the user's telephone system a telephone number to establish a communications connection through a central office to a remote location associated with the telephone number, comprising:

a processor;

a caller ID memory connected to said processor comprising records of telephone numbers, each having at least a first portion;

a user interface comprising an input device and a display operatively connected to said processor for permitting user access to said caller ID memory and user selection of a selected one of said records from said caller ID memory, said user input device further comprising means for receiving a dial command from a user and transmitting the dial command to said processor;

a look-up table memory comprising a list of telephone number first portions and associated calling procedures;

said processor being operatively connected to said look-up table memory for determining a calling procedure associated with the first portion of the telephone number of the selected record; and said processor being operatively connectable to the user's telephone system and to the central office for automatically dialing the telephone number of the selected record in accordance with the associated calling procedure in response to the dial command, wherein said processor further comprises means for automatically updating said look-up table memory when it is determined that the calling procedure associated with the first portion of the telephone number of the selected record in the look-up table is incorrect, so as to automatically adapt the caller ID log device to network changes.

7. The caller ID log device of claim 6, wherein said processor further comprises means for adding the selected telephone number first portion to said look up table memory with a default associated calling procedure when the first portion of the telephone of the selected record is determined not to be listed in the look-up table, and thereby adapt the caller ID log device to network changes.

8. The caller ID log device of claim 6, wherein said user interface is mountable in the user's telephone system.

9. The caller ID log device of claim 6, wherein said means for receiving said dial command comprises a user actuatable key mountable on the user's telephone system.

* * * * *